United States Patent [19]

Henry et al.

[11] Patent Number: 4,538,692

[45] Date of Patent: * Sep. 3, 1985

[54] METHOD AND APPARATUS FOR COMBINATION WEIGHING WITH MULTIPLE STORAGE CUPS FOR EACH SCALE HOPPER

[75] Inventors: Nelson R. Henry, Decatur; Duncan B. Cutler, Dunwoody; William L. Warner, Grayson, all of Ga.

[73] Assignee: Kliklok Corporation, Greenwich, Conn.

[*] Notice: The portion of the term of this patent subsequent to Dec. 6, 2000 has been disclaimed.

[21] Appl. No.: 514,515

[22] Filed: Jul. 18, 1983

Related U.S. Application Data

[63] Continuation of Ser. No. 344,630, Feb. 1, 1982, Pat. No. 4,418,771.

[51] Int. Cl.³ .................. G01G 19/22; G01G 13/16
[52] U.S. Cl. ........................................ 177/1; 177/25; 177/59; 177/103
[58] Field of Search ............ 177/1, 25, 59, 103, 177/114, 116, 119–122, 145

[56] References Cited

U.S. PATENT DOCUMENTS

| | | |
|---|---|---|
| 2,802,658 | 8/1957 | Hensgen et al. |
| 3,073,399 | 1/1963 | Durand |
| 3,311,182 | 3/1967 | Rusnack et al. |
| 3,416,619 | 12/1968 | McClusky |
| 3,557,889 | 1/1971 | Rejsa |
| 3,620,317 | 11/1971 | Henry |
| 3,708,025 | 1/1973 | Soler et al. |
| 3,714,401 | 1/1973 | Yano |
| 3,939,928 | 2/1976 | Murakami et al. |
| 3,945,448 | 3/1976 | Sellers |
| 3,959,636 | 5/1976 | Johnson et al. |
| 3,977,483 | 8/1976 | Greanias |
| 4,123,970 | 11/1978 | Quante |
| 4,164,260 | 8/1979 | Blodgett |
| 4,206,822 | 6/1980 | Mazzucchelli |
| 4,267,894 | 5/1981 | Hirano et al. |
| 4,308,928 | 1/1982 | Oshima ................................ 177/25 |
| 4,344,492 | 8/1982 | Hirano ................................ 177/25 |
| 4,398,612 | 8/1983 | Mikami et al. ........................ 177/25 |
| 4,418,771 | 12/1983 | Henry et al. ........................... 177/25 |
| 4,437,527 | 3/1984 | Omae et al. ............................ 177/25 |
| 4,446,938 | 5/1984 | Kawanishi ............................. 177/25 |

Primary Examiner—George H. Miller, Jr.
Attorney, Agent, or Firm—King, Liles & Schickli

[57] ABSTRACT

A weighing system for making a predetermined weight of a product comprised of individual articles having variable weights by selecting the product stored in a combination of a predetermined number of storage cups. Quantities of the product having targeted weights are distributed to a plurality of scale-controlled hoppers for accurate weighing. The weighed product is fed from each of the scale-controlled hoppers to a plurality of storage cups associted with each of the hoppers, and the product weight associated with each storage cup is registered. Specific combinations of storage cups are tested to determine whether the combined product weights therein add to make the desired weight, within acceptable limits. The first combination found to make the weight is used, and the appropriate storage cups are emptied to a container for receiving the product. The appropriate storage cups are refilled from the scale, and the process repeats. When none of the combinations of the preselected number of storage cups include a total product weight within the acceptable limits, the limits are broadened and the cycle repeats. The weighing system includes a programmed microprocessor for controlling operation thereof, for providing the combination to be tested, for calculating the combined weights, and for determining whether the combined weight falls within the acceptable limits. A specific distributor for the product includes a reversing rotating portion for preventing clogging of the product at openings provided for chutes connecting the distributor to the scale-controlled hoppers.

19 Claims, 3 Drawing Figures

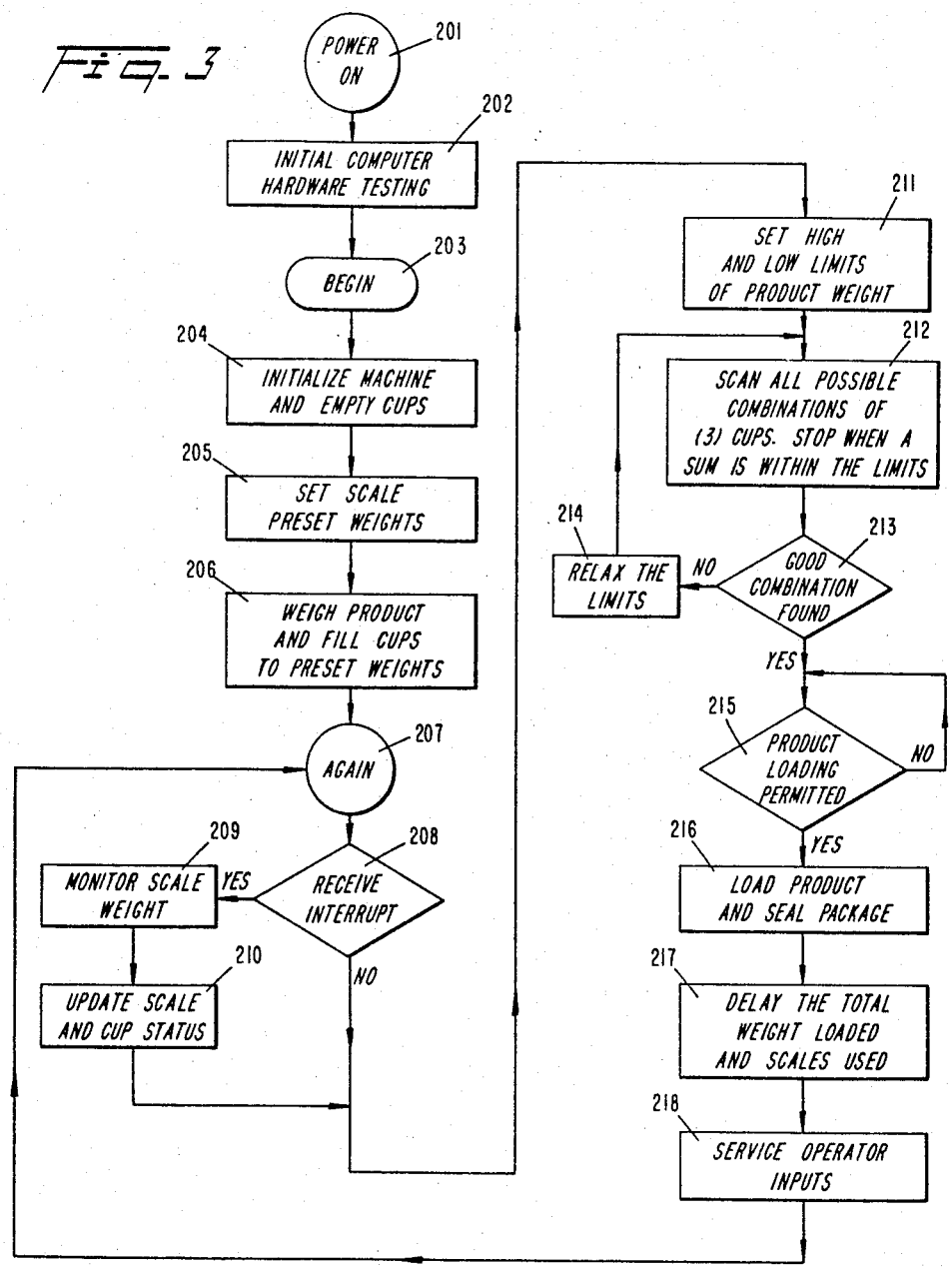

METHOD AND APPARATUS FOR COMBINATION WEIGHING WITH MULTIPLE STORAGE CUPS FOR EACH SCALE HOPPER

This is a continuation, of application Ser. No. 344,630, filed Feb. 1, 1982, entitled METHOD AND APPARATUS FOR COMBINATION WEIGHING, now U.S. Pat. No. 4,418,771, dated Dec. 6, 1983.

TECHNICAL FIELD

The present invention relates to the field of weighing systems, and more particularly to a method and apparatus for making a predetermined weight of a product, comprised of a plurality of articles having widely varying weights, by selecting a combination of weighed quantities of the product from storage cups therefor.

BACKGROUND ART

In the weighing art, it is known to obtain a precise weight of a product formed of a plurality of individual articles having various weights, each of which is a significant fraction of the total desired weight, by the use of "combination weighing devices". Such devices are disclosed, for example, in U.S. Pat. No. 3,939,928 to Murakami et al, and in U.S. Pat. No. 4,267,894 to Hirano et al.

In the Murakami et al patent a number of objects are fed to each of a plurality of weighing hoppers. A complicated electronic circuit is used to test successive combinations of hoppers for a combined weight lower than the previously achieved best weight. The circuit thus ultimately provides a combination having a weight whose deviation from the desired weight is minimal over all possible combinations of hoppers. Objects from the appropriately selected hoppers are delivered to a pool hopper, from whence the objects are discharged to be collected in a bucket. In a particular example, eight weighing machines are used, and a single object is loaded into each such weighing machine. A total of 154 combinations of hoppers for the weighing machines are tested by limiting the number of objects to be taken out to be 4, 5 or 6.

In the Hirano et al improvement on the '928 teaching, a predetermined number of articles is loaded into each of the weighing balances provided. An adding circuit receives as a negative input the intended weight to be obtained, and positive inputs from each of a plurality of holding circuits storing the weights in the balances. A combination generator is provided for gating the outputs of sequential combinations of balances to the adder. The output of the adder is compared with upper and lower deviation limits for the intended weight. If the output of the adder is within the accepted deviation, the selected combination is stored in a combination memory and the adder output used to update the acceptable upper limit of the intended weight. That is, each combination of balances determined to have an acceptable product weight is used to narrow the acceptable deviation limits, thereby arriving at a combination storing the weight closest to the intended weight.

As is apparent from the above summaries, the prior art generates substantially all combinations of balances or hoppers to test all combinations of weights against the desired weight. Such generation is inefficient, and arises particularly from the fact that the items provided into the balances, or weighing hoppers, are not in themselves preweighed. Further, by seeking the best combination of hoppers, needless time is wasted in comparison of the repetitive combinations when an acceptable combination may have already been found. Still further, such prior art approaches provide no solution for the problem arising when none of the tested combinations meets the acceptable deviation from the desired weight. The prior disclosures further suffer from the deficiency of inefficient use of scale and weighing apparatus, in which several scales are each used to provide the product to but a single hopper. The weighing devices remain idle during most of the operation of such combination weighers.

There is thus a need for a combination weighing device having simplified electronic circuitry which generates combinations of only a predetermined number of storage cups, rather than of all possible combinations of storage cups, for more rapidly reaching a decision as to acceptable combinations. Additionally, a combination weighing apparatus having simplified circuitry for rapidly determining an acceptable combination is needed, as well as such a system in which weighing devices are efficiently used.

DISCLOSURE OF INVENTION

It is accordingly an object of the present invention to provide a combination weighing system overcoming the difficulties of the prior art.

It is a more specific object of the present invention to provide a combination weighing system, and a method of operation therefor, capable of quickly reaching a decision as to a combination of storage cups to be used to make a desired weight of a dry flowing product.

It is another object of the invention to provide a combination weighing system having a plurality of storage cups associated with each weighing scale used therein, thereby to provide more efficient usage of the weighing scales.

It still another object of the invention to provide a combination weighing system wherein a product is distributed to a plurality of scale hoppers in quantities having targeted mean weights, thereby to enable selection of combinations of the contents of a predetermined number of storage cups to make the desired weight.

Yet another object of the invention is the provision of a combination weighing system in which the first combination of storage cups having a combined product weight meeting the desired weight within acceptable limits is selected for making the weight.

It is an additional object of the invention to provide a combination weighing system in which certain combinations of storage cups are determined to be favorable over other combinations, and in which the favorable combinations are tested prior to testing of the other combinations.

It is still a further object of the invention to provide a combination weighing system in which a number of combinations of storage cups are tested for making up a desired weight within an acceptable weight range, and in which the acceptable weight range is broadened if the tested combinations fail to make the desired weight within the initially acceptable range.

To achieve the foregoing and other objects, and in accordance with the purpose of the present invention as embodied and broadly described herein, a combination weighing system is described including a plurality of scales and associated hoppers. A distributor is provided to distribute quantities of the product to be weighed to the various scales and associated hoppers. Each scale and hopper has associated therewith a plurality of storage cups for receiving the product therefrom. A control system is included in which various components are provided for establishing acceptable upper and lower limits for a range of product weights to be achieved, for registering the weight or products stored in each of the storage cups, for providing combinations of storage cups and for calculating the total product weight in these combinations. Finally, a selector is provided within the control system for selecting the first combination of storage cups having a combined product weight within the established, acceptable weight range and for signaling the acceptance of the combination and the need for provision of new combinations for making the next desired weight.

In accordance with a further feature of the invention, the control system includes a cycling component for providing a signal indicative of a failure of all combinations of storage cups to provide a weight matching the desired weight within the acceptable limits. The limit setting component is responsive to that signal by broadening the acceptable range, and by initiating a further cycle of operation of the machine.

In accordance with one aspect of the invention, the control system includes a programmed microprocessor which forms the various components thereof. The programmed microprocessor further includes a dividing component for forming a first fraction whose denominator is determined by the predetermined number of storage cups to be used in the combinations to be tested. The numerator of the fraction is determined by the desired product weight, and the fraction so formed is provided to the various scales as a target mean weight to be provided to the hopper and the storage cups associated therewith. In accordance with another feature of the invention, the fraction formed by the divider of the microprocessor is varied to provide second and third fractions offset above and below the first fraction. The offset values are provided to several of the scales, thus targeting some of the scales to receive quantities of the product having a mean weight above the first fraction, and targeting others of the scales to receive quantities of the product having a mean weight below the first fraction.

In accordance with yet another aspect of the invention, the distributor for the product includes a frame having an aperture for receiving the product, and a rotator within the frame for dispensing the product to each of the scale-hopper combinations. Control means are provided for alternately causing the rotator to rotate in a first direction and in a second, opposite direction. More specifically, the control means causes the rotator to rotate in the first direction for a greater period of time than in the second direction.

Still more specifically, the control means includes an eccentric prime mover, a pivoted arm connected to the rotator, and a linkage connecting the prime mover to the pivoted arm. Additionally, a clutch is electrically controlled for selectively engaging and disengaging the pivoted arm from a shaft connected for rotating the rotator.

In accordance with still another aspect of the invention, a method is provided for making up the desired weight of a product by using the apparatus described above. Thus, acceptable upper and lower limits for an acceptable range of product weight are established. Quantities of the product are distributed to the plurality of scale-hoppers, the distribution of the product to any particular hopper terminating upon a determination by the scale that a predetermined weight has been distributed thereto. The product is fed from each of the hoppers to one of the storage cups associated therewith, and the weight stored in the storage cup is then registered. Various combinations of the registered weights are calculated, and a combination of storage cups having a total product weight within the established acceptable limits is selected to make the desired weight.

The present invention more particularly provides for selecting the first combination of storage cups having a total weight within the established acceptable limits.

In order to provide more efficient utilization of the scale weighing systems, the combinations of storage cups tested are ordered to favor selection of combinations involving storage cups associated with different weighing scales. The combinations may also be arranged in an order in which combinations are favored which involve storage cups associated with scales which did not have storage cups associated therewith forming a selected combination in an immediately previous cycle.

In accordance with a significant aspect of the invention, when none of the tested combinations makes the desired weight within the acceptable limits, the acceptable limits are changed to broaden the permitted range. The cycle is then repeated to select a combination of storage cups having a total product weight falling within the broadened acceptable limits.

The foregoing and other objects, features and advantages of the present invention will become more readily apparent to those skilled in the art from the following description wherein there is shown a preferred embodiment of the best mode for carrying out the invention, simply by way of illustration and not of limitation of the invention.

BRIEF DESCRIPTION OF THE DRAWING

The preferred embodiment of the invention will be understood from the following description when taken in conjunction with the accompanying drawings wherein:

FIG. 3 shows a flow chart for use in another form of the control system of FIG. 1.

BEST MODE FOR CARRYING OUT THE INVENTION

Figure 1:
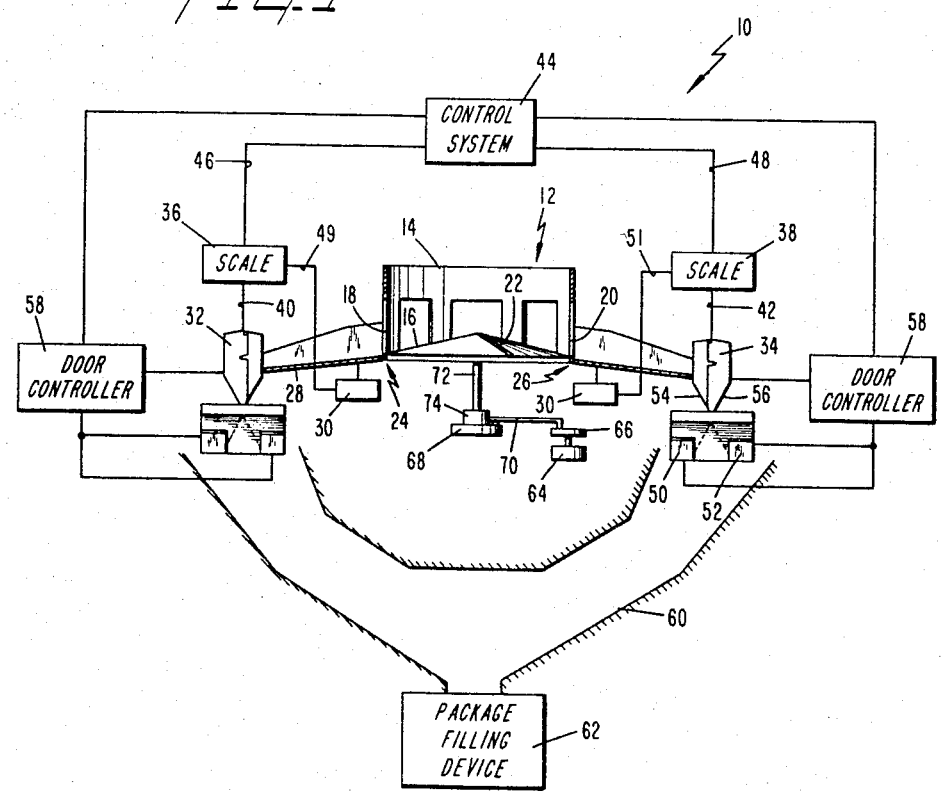
FIG. 1 schematically illustrates the preferred embodiment of the invention and the principles thereof.

Referring now to FIG. 1, an apparatus embodying the principles of the invention is shown for making a desired weight of a solid fluid product, such as food products of various types. The apparatus may be used, for example, to make up desired weights of extruded snacks, potato chips, pretzels, candies or the like for packaging in a package, such as a pillow-type bag.

Devices for filling the product into the package, for forming the bags, or the like, which may be used with the present invention, do not form a part of the invention, however.

As shown in the Figure, a product distributor, shown generally at 10, may include a dispensing apparatus 12 similar to that described in U.S. Pat. No. 3,710,980 to Henry, assigned to the assignee hereof. In such a dispensing apparatus, a distributor 14 with vertically oriented walls is provided with an opening for receiving the product to be dispensed. The specific location of the opening may be varied to accommodate different feeding devices. In the present embodiment, it is contemplated to have an opening at the top for dropping the product into the distributor 14.

A conical member 16 is rotatably disposed within distributor 14 to dispense the product through a plurality of openings provided in the peripheral structure of the distributor. Two such openings are symbolically shown at 18 and 20. Preferably, conical member 16 is provided with longitudinal ribs, symbolically shown at 22, for frictionally rotating the product within the distributor.

Product dispensed by apparatus 12 is provided through openings 18 and 20 to a plurality of product conveying, or feeding, devices illustratively shown at 24 and 26, for example. The conveying devices may be similar to the vibratory conveyors shown in U.S. Pat. No. 3,578,094 to Henry et al. and assigned to the assignee hereof. Such a device may include an outlet chute 28 and a vibrator motor 30.

As further shown in the figure, each conveyor provides the product to a scale hopper, shown at 32 and 34. The weight of product provided to hoppers 32 and 34 is monitored by scales 36 and 38 which provide electrical signals representative of the provided weight. Scales 36 and 38 are symbolically shown as mechanically linked to their respective hoppers by mechanical linkages 40 and 42, although it is to be understood that the scales may be integrally connected to the hoppers.

The scales form a feedback system in conjunction with the associated hoppers and vibratory conveyors provided therefor. One such feedback scale known to those skilled in the art is sold under the designation "Clipper 713S" manufactured by The Woodman Co. Inc., assignee of the present invention. The scales 36, 38 of the weighing system control the feeders 24 and 26 to provide particular weights of the product to hoppers 32 and 34. The specific weights to be provided to the scale hoppers are determined by a control system 44. The control system 44 is in two way electrical communication with scales 36 and 38 over two way electrical communication paths 46 and 48, respectively. Thus, the control system receives information from the scales pertaining to the weight of product provided to the associated hoppers, and further provides information to the scales as to the targeted mean weight for the product to be dispensed thereto. Scales 36 and 38, responsive to the targeted mean weights provided thereto by control system 44, thus provide signals along paths 49 and 51 to the vibrators associated with the particular feeding devices therefor. The scales thus terminate feeding of the product to hoppers 32 and 34 when a predetermined weight of the product has been detected therein.

It should be understood that other control devices may be used for controlling the quantity of product dispensed to the hoppers. For example, the drum 14 may discharge the product directly into the scale hoppers through controllable doors. The scales associated with the hoppers may provide the control signals for closing the respective doors once the appropriate quantity of product is dispensed.

In the preferred embodiment, however, vibratory feeding devices are used. It should be recognized that once the feeding devices are stopped under control of scales 36 or 38, the solid product accumulates at openings 18 and 20, thereby preventing further product discharge to the chutes.

It is thus seen that targeted weights of product may be provided to a plurality of scale hoppers distributed about the product distributor. As will be appreciated by those skilled in the art, the weights accumulated in each of the hoppers can be targeted for a desired value, but will actually provide variations about a mean which approximates such a desired value. This is due to the fact that the desired weight is a finite multiple of the weight of each object in the product. For example, in packaging pretzels where each pretzel may typically provide approximately five percent of the packaged weight, a single pretzel may vary from three to eight percent of the total weight to be made. Thus, although the actual weight of product within the hoppers is below the targeted weight, provision of an additional object may raise the weight to a value above the targeted weight.

Combination weighing devices of the prior art provide for approximating a total weight to be made by combining the weight of some subset of product quantities. The present invention advances over the prior art, inter alia, by targeting specific weights for the quantities to form the subsets.

That is, in accordance with the present invention a number of scales and associated hoppers are provided. The illustration of FIG. 1 shows two such scales, but it is to be understood that any number may be provided. In one example, eight scales are provided. If each scale is provided with a targeted weight of one third of the total weight to be made, it is understood that only combinations of three hoppers need be tested to make up the product weight to be packaged. Prior art devices, as described previously, do not provide such target weights to the hoppers to be tested, and accordingly must test all combinations of any number of hoppers in order to make the desired weight. A further advance of the present invention includes the targeting of some of the scales to receive a weight offset from the fraction of weight to be made by a predetermined positive amount, and targeting others to receive a weight offset from the fraction of the desired weight by a negative amount. This approach increases the likelihood that a combination of weights will be found, some above and some below the targeted fraction of the weight to be made, which combine to provide the desired weight to be made.

In accordance with yet another feature of the invention, each scale hopper is provided with a plurality of associated storage cups. Thus, hopper 34 is provided with associated storage cups 50 and 52, for example.

By providing a plurality of storage cups for the hopper associated with each scale, it is seen that the operational duty-cycle of the scales is increased. That is, by having two storage cups associated with each scale, the scales will typically be used twice as frequently for weighing and loading the storage cups as would otherwise be the case. Further, for a given number of storage cups to be utilized in a combination weighing system, the present invention is seen to require half the number of weighing systems as the prior art, thus providing a substantial reduction in cost.

Further referring to the mechanical operation of the system, each scale-hopper is provided with two discharge doors 54 and 56. As symbolically shown in FIG. 1, a discharge controller 58 controls the doors of the hoppers and further controls discharge of the storage cups. The discharge controller is further in communication with the control system 44. Accordingly, when the control system 44 determines that a particular one of hoppers 50 and 52 is empty, controller 58 is directed to open the respective door 54 or 56 of scale hopper 34, if filled. If the hopper is empty, control system 44 directs scale 38 to activate the vibratory feeder to provide product thereto. When it is determined that the hopper is filled, controller 58 causes the appropriate door of the hopper to open for discharging the product into the appropriate storage cup. Finally, when a particular storage cup is selected as part of a combination needed to make the product weight, controller 58 causes a door to open in the selected storage cup for discharging its contents to a chute 60, thereby providing the product to a package filling device 62. As previously mentioned, the packing device may be a bag maker which forms, fills and seals a bag containing the desired weight of the product.

Referring once again to dispensing apparatus 12, in the preferred embodiment the conical member 16 is provided with a shallow angle, for example fifteen degrees. Conical member 16 is further rotated in an oscillatory, back-and-forth motion, in order to dislodge any product which may gather at the openings 18 and 20 of drum 14. By dislodging accumulated product, the openings are kept open and the product is more easily distributed to the conveying or feeding devices 24 and 26.

The oscillatory motion, however, is not symmetrical. That is, a predominant forward direction of rotation is provided, with periodic backward motion. Such backward motion is provided to the conical member for shorter time periods than is the forward motion. A structure for achieving such oscillation is shown in FIG. 1 as including a prime mover 64, which may be an electrical motor, having an eccentric output member 66. A pivoted arm 68 is driven by the motion of eccentric member 66, and is connected thereto by a linkage 70. Because of the schematic nature of the Figure, supports and other details of the prime mover and the product distributor are not shown.

Conical member 16 is seen to be mounted on a shaft 72. An electrical clutch 74 intermittently couples and decouples pivot arm 68 to shaft 72 for rotating conical member 16. It will thus be appreciated that if clutch 74 were constantly engaged, conical member 16 would be made to oscillate back and forth in substantially equal increments as eccentric output member 66 rotate through its cycle. However, clutch 64 is periodically disengaged during portions of the motion of arm 68 in a particular directions. That is, in each counterclockwise motion of arm 68, clutch 74 may be disengaged for eighty percent of the time. Thus, the conical member is seen to be driven by arm 68 during its full clockwise motion, but driven by arm 68 during only twenty percent of the counterclockwise motion. In such an arrangement, conical member 16 is seen to have a predominantly clockwise rotation. Specifically, the conical member rotates clockwise for a first period of time, followed by counterclockwise rotation for a predetermined fraction of that time. An adjustable cam and microswitch arrangement may be provided on the prime mover apparatus for varying the time periods of engagement and disengagement of clutch 74.

Figure 2:
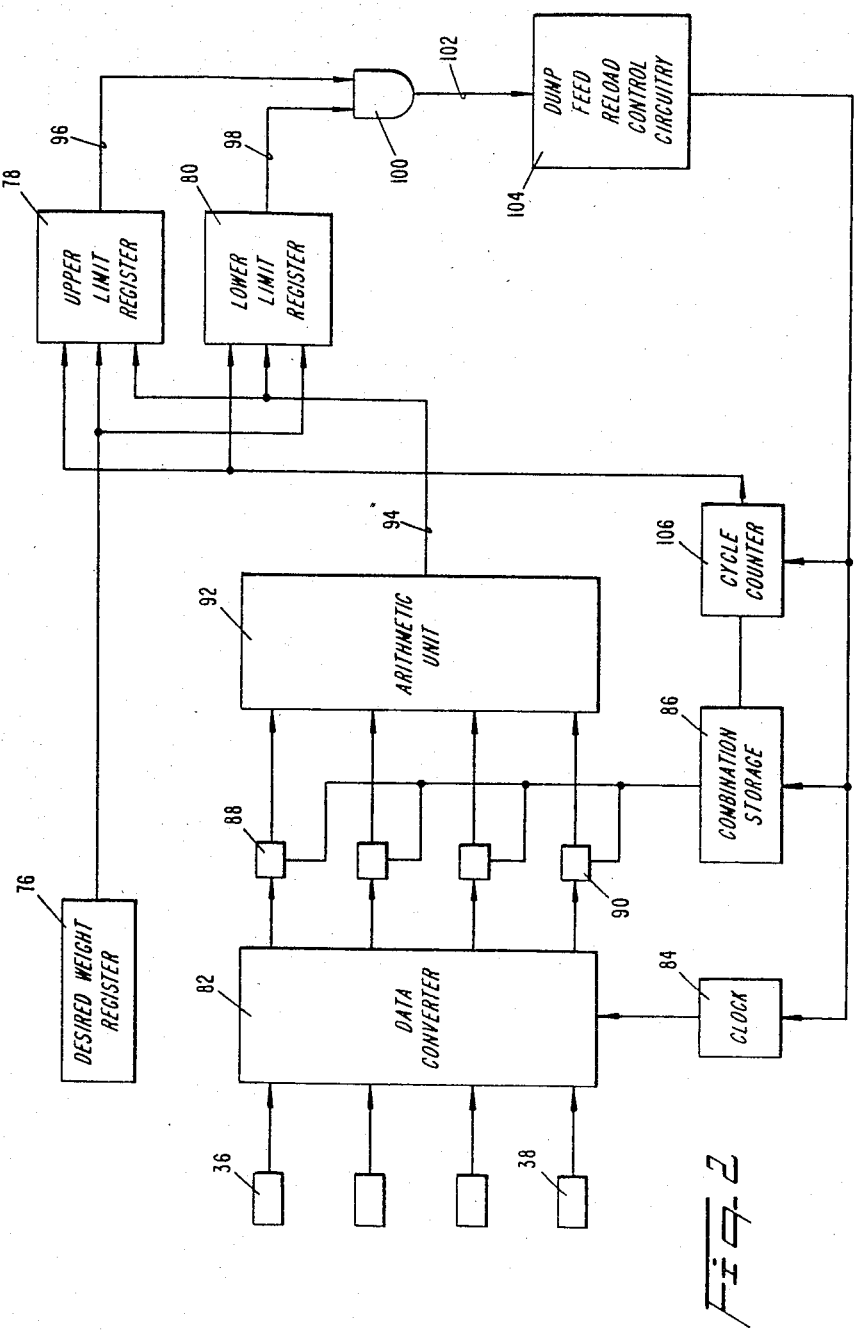
FIG. 2 illustrates schematically a control system for the embodiment of FIG. 1.

Referring now to FIG. 2, one embodiment of control system 44 is shown as including a desired weight register 76 for storing the weight of product to be made. Thumbwheel switches may be provided for manually setting the desired weight register.

Upper and lower limit registers 78 and 80 are provided for comparing the total product weight in a selected combination of storage cups with an incremented form of the desired weight, thereby to determine whether the selected combination includes a total weight lying within some acceptable range of the desired weight to be made. Registers 78 and 80 thus store increments for addition to (and possible subtraction from) the desired weight signal provided by register 76. These increments are added to (and subtracted from) the desired weight to provide the upper (and lower) limits of the acceptable range. Addition and subtraction of the increment may be performed in registers 78 or 80, or alternatively may be performed in a separate arithmetic unit (not shown).

In operation, a data converter 82 is clocked by a system clock 84 to read in the weights of product in hoppers 32 ... 34 as provided by scales 36 ... 38. At the same time that discharge controller 58 causes hoppers 32 ... 34 to discharge to the associated storage cups, data converter 82 transfers the data input from scales 36 ... 38 to storage locations provided for the specific storage cups associated with the various scales. The weight information is preferably transferred along with transfer of the product from scale-hopper to storage cup.

As previously described, the present invention permits selection of a desired number of storage cups to be used in the combinations tested for making the desired weight. This objective is achieved by targeting each of the scales 36 ... 38 to receive a weight equal to some fraction of the desired weight to be made. For example, if the desired weight to be made is fifteen ounces, and each scale is targeted to receive a weight of five ounces, then combinations of sets of three storage cups are tried to provide some such set having a combined weight within the acceptable limits of the desired weights to be made.

In that regard, a combination storage 86 is provided storing all combinations of three storage cups, for example, to be tested. The signals generated by the stored combinations are used to enable combinations of gates 88 to 90 to pass the weights of selected ones of the storage cups from data converter 82 to an arithmetic unit 92. Arithmetic unit 92 is used to add the signals representing the weights of the selected combination of storage cups. A signal representing the total, or combined, weight of the selected storage cups is provided to upper and lower limit registers 78 and 80 via a connecting path 94. The total weight is compared within upper and lower limit registers 78 and 80 against the incremented (or decremented) values of the desired weight to be made. Upon a favorable comparison, the appropriate registers output a logic one signal on lines 96 and 98. For upper limit register 78 a favorable comparison is determined when the total weight is no greater than the incremented desired weight. For lower limit register 80, a favorable comparison is determined when the total weight is no lower than the decremented desired weight.

Upon determining that the total weight is within the acceptable limits, i.e., no greater than the incremented desired weight and no less than the decremented desired weight, and AND gate 100 outputs a signal on line 102 to a control circuit 104. Control circuit 104 causes the contents of the selected storage cups to be dumped into chute 60 for transfer to filling device 62, and also causes transmission of appropriate signals to the scales associated with the dumped storage cups to initiate feeding of product to the appropriate hoppers. If the hoppers associated with the selected storage cups are full (a preferred situation), the appropriate doors of the hoppers are opened to reload the storage cups. Thus, by providing a scale associated hopper, it is seen that the storage cups may be quickly refilled to enable the quick repetition of cycles wherein the desired weight is made.

As will be appreciated, such quick repetition is somewhat hampered if a selected combination includes, for example, both storage cups 50 and 52 of a particular hopper 34 (shown in FIG. 1). In that event, the filled hopper quickly reloads one of the two storage cups, but an entire feeding cycle is completed prior to reloading of the second associated storage cup.

In one feeding device, 1.25 seconds are typically required to fill and settle the product in a particular scale hopper. Thus, all such combinations of storage cups involving a common hopper includes an empty storage cup. These combinations typically fail the comparison in the lower limit register 80 for the duration of the fill time. This merely delays operation of the system.

In order to insure more rapid operation, combinations including more than one storage cup filled from a single hopper are disfavored. The bias against such combinations is introduced into combination storage 86 by storing combinations of storage cups associated with differing hoppers ahead of the disfavored combinations, so that for each cycle of operation it is the favored combinations that are first tested. Such a bias is easily introduced into a fixed storage by properly ordering the set of combinations to be tested. A further bias may be introduced, however, in order further to speed operation of the invention. As will be appreciated, in a machine cycle following a selection of a particular storage cup, the scale-hopper associated therewith is emptied and undergoes a feeding sequence. If a storage cup associated with that hopper is again chosen during that next machine cycle, the hopper, which is being refilled at the time, is not in a position for rapidly reloading the storage cup until conclusion of the feeding sequence. Thus, the combination storage may further bias the combination sequence by flagging, for one machine cycle, the storage location of any combination involving a hopper undergoing a feeding sequence during that machine cycle. By providing first the unflagged combinations to be tested and then the flagged combinations, it is seen that occurrences of the undesirable situation referred to above may be reduced, thus enhancing the operating speed of the invention.

Upon finding a combination meeting the desired weight limits, and making the weight, control circuit 104 provides a signal to combination storage 86 to provide combinations in order again to gates 88 . . . 90 for a new cycle of making the desired weight.

In the event that no combination provided by combination storage 86 and tested in arithmetic unit 92 and registers 78 and 80 falls within the acceptable limits for the desired weight, a cycle counter 106 is triggered, by the combination storage 86 having reached its final combination, for example, to change one or both increments used in the upper and lower limit registers 78 and 80. Thus, the upper limit of acceptable weight may be increased or the lower limit may be decreased. It is understood the weights are increased only by a small increment each time so as to avoid any problem of product "giveaway" (increased weight) or package lightness (decreased weight). In any case, the lower limit is not changed to fall below the minimum weight required by governmental regulations. It is not necessary, of course, to increase both deviations at the same time. If performing a number of cycles with successively broadened deviation ranges is required, control circuit 104 triggers cycle counter 106 when a successful combination is found to re-initiate the limits in upper and lower limit registers 78 and 80. The next cycle of combination testing and weight comparison is thus made against the initial, narrow acceptable limits. It should also be noted that broadening of the acceptable weight limits need not be accomplished in uniform steps. That is, after incrementing the upper limit once or twice, it might be preferable to determine whether there exists any combination falling within a substantially increased weight range, rather than to dump the contents of all the storage cups and to reinitiate the machine. Accordingly, the second or third incrementation may raise the acceptable upper limit by an amount larger than the increment previously applied thereto.

In accordance with the foregoing description, it is seen that the control system of FIG. 2 triggers the control circuit 104 to dump the contents of the first combination of storage cups having a total weight within the acceptable limits for the desired weight to be made.

In a combination weighing apparatus according to the invention, in which a plurality of storage cups are preferably used in conjunction with each scale, the number of available combinations of cups is substantially increased.

To further explain, the number of combinations of N things taken R at a time is given by:

$$\frac{N!}{(N - R)! \times R!}$$

Thus, in a prior art combination weighing system having eight scales there are 56 combinations of three scales at a time. In a combination weighing system according to the present invention, however, in which two storage cups may be provided for each scale, there are 560 combinations of three storage cups at a time. Such a dramatic increase in the number of available combinations provides increased assurance that a combination will be found having a total product weight within the acceptable limits for the desired weight to be made. Alternatively, if 56 combinations suffice, the present invention permits the generation of 56 such combinations by using only four of the scale devices, rather than 8 as required in the prior art.

In the preferred embodiment of the invention, control system 44 is comprised of a programmed microprocessor, including therein a number of registers, a storage, an arithmetic unit for addition and comparison, and the like. The microprocessor is preferably connected to communicate with the various scales, thereby to determine the product weight provided to each hopper. Additionally, the microprocessor may be programmed to generate command signals for the scales to activate and deactivate the product conveying devices. Still further, the microprocessor may communicate with discharge controller 58 thereby to determine whether particular hoppers are full or empty, as well as to detect which storage cups are empty. The microprocessor may further generate control signals causing controller 58 to open the appropriate hopper door, and to discharge a selected storage cup into chute 60. Finally, the microprocessor may communicate with, and control, the filling device 62 to operate upon discharge of a selected combination of storage cups thereto.

A microprocessor used to control the present invention as above described operates in accordance with a particular program provided therefor. One such program is illustrated by the flow chart of FIG. 3, in which step 201 indicates the initial powering of the system. At step 202 operation of the electronic hardware is verified by turning on a display and by sensing inputs from a number of switches. Faulty computer components may be tested at this step. System initialization is conducted at step 203, and initialization of the weighing apparatus is begun at step 204.

In this step, all scales and storage cups are emptied, and all inputs and outputs are reset to a known initial condition. At step 205 individual preset target weights for the various scales are obtained, as well as the total product weight to be made.

In step 206 the product feeding devices are initiated, and the scales provide the target weights of the product to the individual hoppers and storage cups associated therewith.

The main operating loop of the system begins at step 207. During operation of the loop, interrupt processing may occur at any point. Interrupts may be provided by any of the scales, for example, to indicate a final determination of product weight received from the product conveying devices. In the event that a scale interrupt is received at step 208, the weight reading is obtained from the scale at step 209, and the status of the hopper and storage cups loaded thereby is updated at step 210 to indicate appropriately an empty or a full status. Upon conclusion of the interrupt servicing subroutine at step 210, the microprocessor is programmed to establish the acceptable upper and lower limits for the product quantity to be weighed. Such limits are established at step 211.

At step 212 the microprocessor is programmed to access all combinations of three storage cups, for example. Such combinations may be stored in a register or other memory associated therewith. The microprocessor may thus access sequential storage addresses having the individual combinations stored therein. Each location in storage may be addressed, and the contents of that location read out to provide a combination of weights from predetermined storage cups. The combinations may be identified by the storage cup reference numbers, or alternatively may identify storage locations in which the individual storage cup weights are stored.

In either case, the product weight in the storage cups identified by the combination selected in step 212 are summed and repeatedly compared against the upper and lower limits. At step 213 it is determined whether a good combination has been found. When the determination is in the affirmative, it is further determined at step 215 whether the product may be filled in the packaging machine. Such a determination is made depending upon status signals, busy signals and the like which may be communicated between filling device 62 and the microprocessor. If the filling device is busy, the microprocessor loops repeatedly until filling may be accomplished.

If a determination is made at step 213 that none of the possible combinations satisfies the acceptable limits, the limits are relaxed at step 214 by appropriately incrementing registers or other storage locations in which the upper and lower limits are stored. The program then loops back to perform step 212 again, in which all the possible combinations of storage cups are again tested for the acceptable weight.

As described, upon determining that the product may be loaded by filling device 62, the microprocessor proceeds from step 215 to step 216 wherein control signals are generated for filling the package or container with product and for sealing the package. Additionally, tne next package for filling is prepared.

The total weight loaded into the package is caused by the microprocessor to be displayed at step 217. Optionally, the scales used to make the desired weight are also caused to be displayed by the microprocessor at that step.

Finally, any operator inputs are detected and serviced at step 218, from which the microprocessor is instructed to return to the beginning of the main loop for the system at step 207.

With respect to step 205, the following observations are noted. If all of the scales in a multiple-scale weighing system have mean weight outputs which are exactly the same, and if a particular number, e.g. 3, of these scales are combined to make up the final desired weight, then the mean combined weight will be three times the mean of the individual scale weights. Accordingly, the mean of the output weight cannot be held any closer to the desired weight than the mean of the individual scales. Similarly, should the mean of the individual scales drift up or down, the mean of the final output weights similarly drifts up or down by the same amount. Moreover, for all under-weight combinations there must be corresponding over-weight combinations, and vice versa. If acceptable weight limits are broadened only by providing for acceptance of increasingly overweight combinations (legal restrictions, for example, prohibiting the acceptance of under-weight combinations), then an increasing number of storage cups ultimately store underweight portions of the total desired weight which may not be useable in any combination.

According to the present invention, this problem may be overcome by offsetting the target weights for one or more of the scales to be higher than the input mean (e.g., desired weight divided by three), and to offset the target weights for one or more scales to be lower than the input mean. When this approach is taken, the output is no longer rigidly related to the input. By choosing the offset high scales more frequently, the output mean weight may be raised. Similarly, by choosing the offset low scales more frequently, the output mean weight may be lowered.

Although the target mean weights for various scales may be staggered, an experimental computer simulation of the results indicates that such staggering is unnecessary. Accordingly, the preferred embodiment provides for all scales receiving a positively displaced offset target mean weight to receive substantially the same target mean weight, and for all scales receiving negatively displaced target mean weights to receive a common target mean weight as well.

By providing the variation and target mean weights, the selection process for choosing acceptable combinations automatically uses the high or low scales as required. No additional costly programming or hardware is thus needed, nor is any such additional expense desirable to overcome the problem herein above described.

Referring once again to FIG. 1, a further advantage of the present invention is noted with respect to the arrangement of the scale hoppers and associated storage cups, illustrated by hopper 34 and storage cups 50 and 52, for example. In order to discharge the product from hopper 34 into more than one storage cup, conventional diversion of the product to the appropriate storage cup typically uses a moveable diverter, which may comprise a pivoted vertical plate between the hopper and the two storage cups. This approach, however, requires vertical displacement between the hopper and cups. Such vertical displacement may be incompatible with available overhead clearance, and may further cause damage to the product which must fall through a greater vertical distance. It is accordingly an advantage of the present invention that no such vertical displacement is necessary. As previously described, discharge doors 45 and 56 are used to discharge the product from the hopper to the storage cups. Accordingly, the storage cups may be located immediately below the hopper.

There has thus been described a multiple scale combination weighing system in which a product is delivered to each scale by a feeder which is responsive to the scale. As soon as a preset, targeted, product weight is received by the scale, the product feeding device operation is terminated. After a short pause to permit stabilization of the scale, the scale is interrogated in order to determine the true weight of the product in its hopper. The weight of the product in the scale is stored, and when an empty storage cup is available, the product is discharged from the scale hopper to the storage cup and the appropriate product weight transferred to a storage location associated with the storage cup receiving the product.

The inventive system provides for summing of the weight of product in various selected combinations of storage cups to determine whether the sum weight falls within a preset acceptable range about the desired weight to be made. The first combination to fall within these limits is selected, the storage cups dumped and a container loaded and sealed. If no acceptable combination is found, then one or both of the limits is broadened and the process repeated. The scales are provided with particular target weights to assure that combinations of only a particular number of storage cups need to be tested to make the desired weight. Some of the scales are provided with target weights higher than this value, and some provided with target weights lower than this value. More efficient and less expensive operation is assured by providing a plurality of storage cups for the various scales. Efficient feeding of product is insured by providing a conical member rotating within a distributor for dispensing the product through a plurality of openings situated about the periphery to corresponding product conveying devices. Apparatus is further provided for rotating the conical member in an oscillating motion, in which the forward or feed direction of motion predominates over the other.

The foregoing description of a preferred embodiment of the invention is presented for purposes of illustrations and description, and is not intended to be exhaustive or to limit the invention to the precise form disclosed, since many modifications and variations are possible in light of the above teaching. The embodiment was chosen and described in order to best explain the principles of the invention and its practical application, thereby to enable others skilled in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

We claim:

1. A method for making up a desired weight of a solid, free flowing product as a combination of contents of a predetermined number of storage cups comprising the steps of:
   (a) establishing acceptable upper and lower limits for an acceptable range of product weight to be achieved;
   (b) distributing quantities of the product to a plurality of scale hoppers;
   (c) terminating the distribution of the products to each hopper in accordance with a predetermined amount distributed thereto and weighing each amount by a scale associated with each hopper;
   (d) feeding the product from each hopper to an available one of at least two storage cups associated with that particular hopper;
   (e) registering the weight of product stored in each of the storage cups of the system;
   (f) calculating the total weight of successive combinations of the registered product weights of said predetermined number of storage cups including separate combinations using each of the two cups for the hoppers; and
   (g) making the desired weight by selecting a combination of storage cups having a total product weight within the established acceptable limits.

2. The method of claim 1 wherein said step of making the desired weight comprises the step of selecting from the cups including the plurality of cups for each hopper the first combination of storage cups having a total weight within the established acceptable limits.

3. The method of claim 2 further comprising the step of establishing a target mean weight for the product to be distributed to each of the scale-hoppers as a first fraction having a denominator determined by the prdetermined number of storage cups to be used in making up a combination and a numerator determined by the desired product weight.

4. The method of claim 3 wherein said step of establishing a target mean weight comprises the further steps of producing second and third fractions having values offset above and below said first fraction and providing said second and third fractions to several of the hoppers, thereby targeting some of the hoppers to receive quantities of the product having a means weight above the first fraction and others of the hoppers to receive quantities of the product having a mean weight below the first fraction.

5. The method of claim 1 further comprising the step of ordering successive combinations of storage cups whose weights are to be totalled in a sequence having a combination of storage cups fed from hoppers of different scales ahead of combinations including plural storage cups fed from a hopper of a single scale, whereby combinations of storage cups fed from different scales are favored over combinations including storage cups fed from a single scale.

6. The method of claim 5 further comprising the step of ordering successive combinations of storage cups fed from hoppers of scales not used in making the desired weight in an immediately preceding application of the method ahead of combinations including storage cups fed from hoppers of scales used in making the desired weight in an immediately preceding application of the method, whereby combination of storage cups fed from scales not used in making the desired weight in an immediately preceding application of the method are favored over combinations of storage cups fed from hoppers of scales used in making the desired weight in an immediately preceding application of the method.

7. The method of claim 1 further comprising the steps of:
   (a) determining the occurrence of a situation wherein none of the combinations of product weight of the cups have a total weight within the established acceptable limits;
   (b) broadening the acceptable range of product weights to be achieved by changing at least one of the acceptable limits;
   (c) making if possible the desired weight by selecting a combination of storage cups having a total product weight within the changed acceptable limits; and
   (d) repeating steps a, b and c until a combination of storage cups is found having a total product weight within some acceptable broadened range therefor.

8. The method of claim 7 wherein said broadening step comprises the step of reducing the lower limit of the acceptable range.

9. The method of claim 7 wherein said broadening step comprises the step of raising the upper limit of the acceptable range.

10. The method of claim 1 wherein the step of feeding the product to one storage cup from said hopper is through one door directed toward said one cup and feeding to the other storage cup is through another door directed toward said other cup.

11. Apparatus for making up a desired weight of a solid, free flowing product as a combination of contents of a predetermined number of storage cups comprising:
    means for distributing quantities of the product to a plurality of scale hoppers;
    scale means for providing a predetermined weighed quantity of the product to a hopper associated therewith;
    at least two storage cups associated with each of said hoppers for receiving the product therefrom; and
    a control system including:
    means for establishing acceptable upper and lower limits for an acceptable range of product weights to be achieved;
    means for registering the weight of product stored in each of the storage cups in the system;
    means for calculating the total product weight in particular combinations of said predetermined number of storage cups including separate combinations using each of the two cups for the hoppers;
    means for providing successive combinations of storage cups to said means for calculating the total product weight; and
    selecting means receiving the calculated total product weight in combinations of storage cups and further receiving the upper and lower limits for the acceptable range of product weight from said means for establishing, for selecting the first combination of storage cups having a combined product weight falling within the established upper and lower weight limits for making the desired weight,
    said selecting means providing a first signal to said means for providing combinations, for providing new combinations to said calculating means for making the next desired weight after selecting a combination.

12. Apparatus as recited in claim 11 further comprising means for dumping product from the selected combination of storage cups to a container therefor and for reloading the emptied storage cups, responsive to an output signal from said selecting means.

13. Apparatus as recited in claim 12 wherein said control system further comprises cycling means, responsive to said means for generating successive combinations for providing a second signal to said means for establishing, the second signal indicative of a failure of all combinations of storage cups to provide a weight falling within the established upper and lower limits, said means for establishing including means responsive to said second signal for broadening the acceptable range of product weight to be achieved.

14. Apparatus as recited in claim 13 wherein said means for broadening includes means for raising the upper limit of the acceptable range.

15. Apparatus as recited in claim 13 wherein said means for broadening includes means for increasing the acceptable range of product weight by successively greater increments for successive cycles.

16. Apparatus as recited in claim 11 wherein said means for broadening includes means for reducing the lower limit of the acceptable range.

17. Apparatus as recited in claim 11 wherein said control system comprises a programmed microprocessor which forms the establishing, registering, calculating, providing, and selecting means, and which further includes dividing means for forming a first fraction, having a denominator determined by the predetermined number of storage cups to be used in the combination and a numerator determined by the desired product weight, the first fraction provided to the scale means as a target mean weight to be provided to the hopper associated therewith.

18. Apparatus as recited in claim 17 wherein said control system includes means for varying the fraction formed by the dividing means, thereby providing second and third fractions having values offset above and below said first fraction to several of said scale means, whereby some of said scale means are targeted to receive quantities of the product having a mean weight above the first fraction, and others of said scale means are targeted to receive quantities of the product having a mean weight below the first fraction.

19. Apparatus as recited in claim 11 wherein the hopper includes a plurality of doors equal to the number of storage cups associated with that hopper, and being operative upon opening to direct the product to the proper storage cup requiring filling.

* * * * *